(Model.)
J. BANVOETZ.
HAY FORK.
No. 269,557. Patented Dec. 26, 1882.
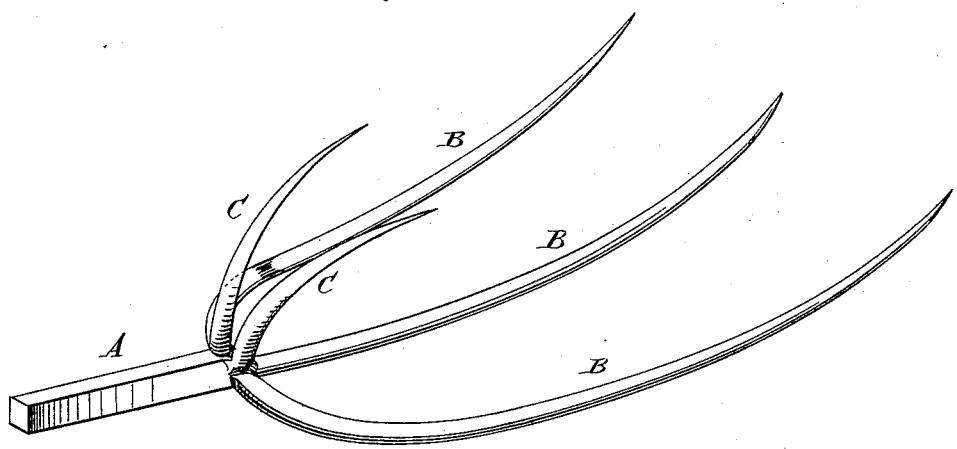
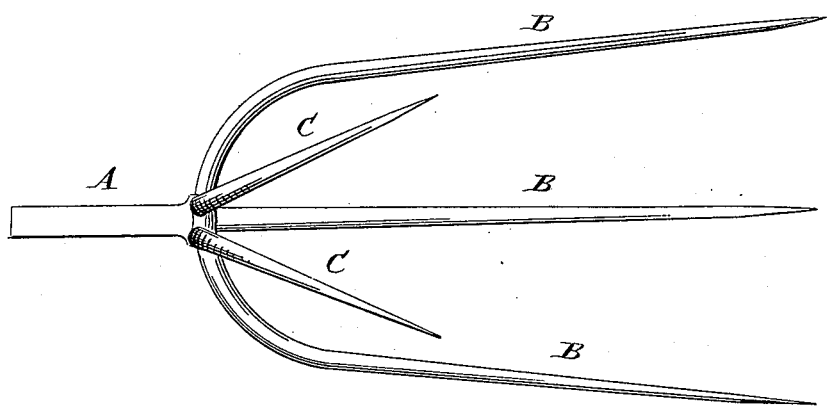
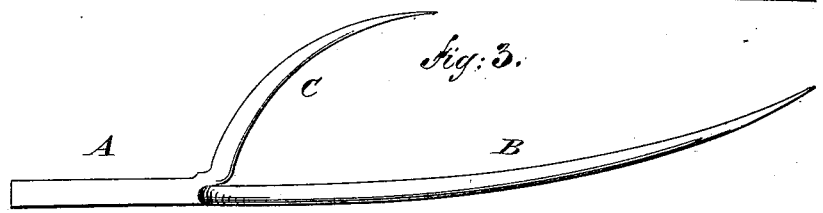
WITNESSES:
Chas. Nida
C. Sedgwick
INVENTOR:
J. Banvoetz
BY Munn & Co
ATTORNEYS.

UNITED STATES PATENT OFFICE.

JOHN BANVOETZ, OF EMPORIA, KANSAS.

HAY-FORK.

SPECIFICATION forming part of Letters Patent No. 269,557, dated December 26, 1882.

Application filed January 10, 1881. (Model.)

*To all whom it may concern:*

Be it known that I, JOHN BANVOETZ, of Emporia, in the county of Lyon and State of Kansas, have invented a new and useful Improvement in Hay-Forks, of which the following is a specification.

Figure 1 is a perspective view of my improvement. Fig. 2 is a plan view of the same. Fig. 3 is a side view of the same.

The object of this invention is to increase the capacity of hay-forks, especially for holding fine hay.

Similar letters of reference indicate corresponding parts.

A is the shank, and B are the tines, of an ordinary hay-fork. C are the supplementary prongs, which are formed upon or rigidly attached to the shank A or the middle part of the head of the fork. The prongs C are curved upward, forward, and outward, as shown in Figs. 1, 2, and 3, so that when the forks are pushed into the hay they will press and pack the hay together, and thus increase the capacity of the fork.

I am aware that it is not new in grain-forks to use one additional tine above the others in the middle, and bent so that its convex side is opposite the concavity of the ordinary tines, the object being to keep the straw and bundles straight. My fork is not for handling grain, but hay, while those referred to are not adapted to my purpose, because they have but one tine additional, and that exactly in the middle, while by using two that diverge laterally and have their concavities opposite those of the ordinary tines, the finest hay is packed and held in large forkfuls.

Having thus fully described my invention, I claim as new and desire to secure by Letters Patent—

1. A hay-fork having two diverging prongs, C C, branching out from the head thereof, having their concavities opposite to the concavities of the prongs B, and made of less length than said prongs B, as shown and described.

2. A hay-fork having the tines B curved in one direction and the tines C curved, as shown, in the opposite direction over the spaces between the tines B, by which reverse curving the hay is forced between the tines and held, substantially as described.

JOHN BANVOETZ.

Witnesses:
 ED M. WATERBURY,
 ED S. WATERBURY,
 M. CORDLEY.